April 12, 1960
P. W. BRANDT ET AL
2,932,299
PORTABLE HYDRAULIC HAY STACKING CRIB
Filed Aug. 16, 1957
2 Sheets-Sheet 1
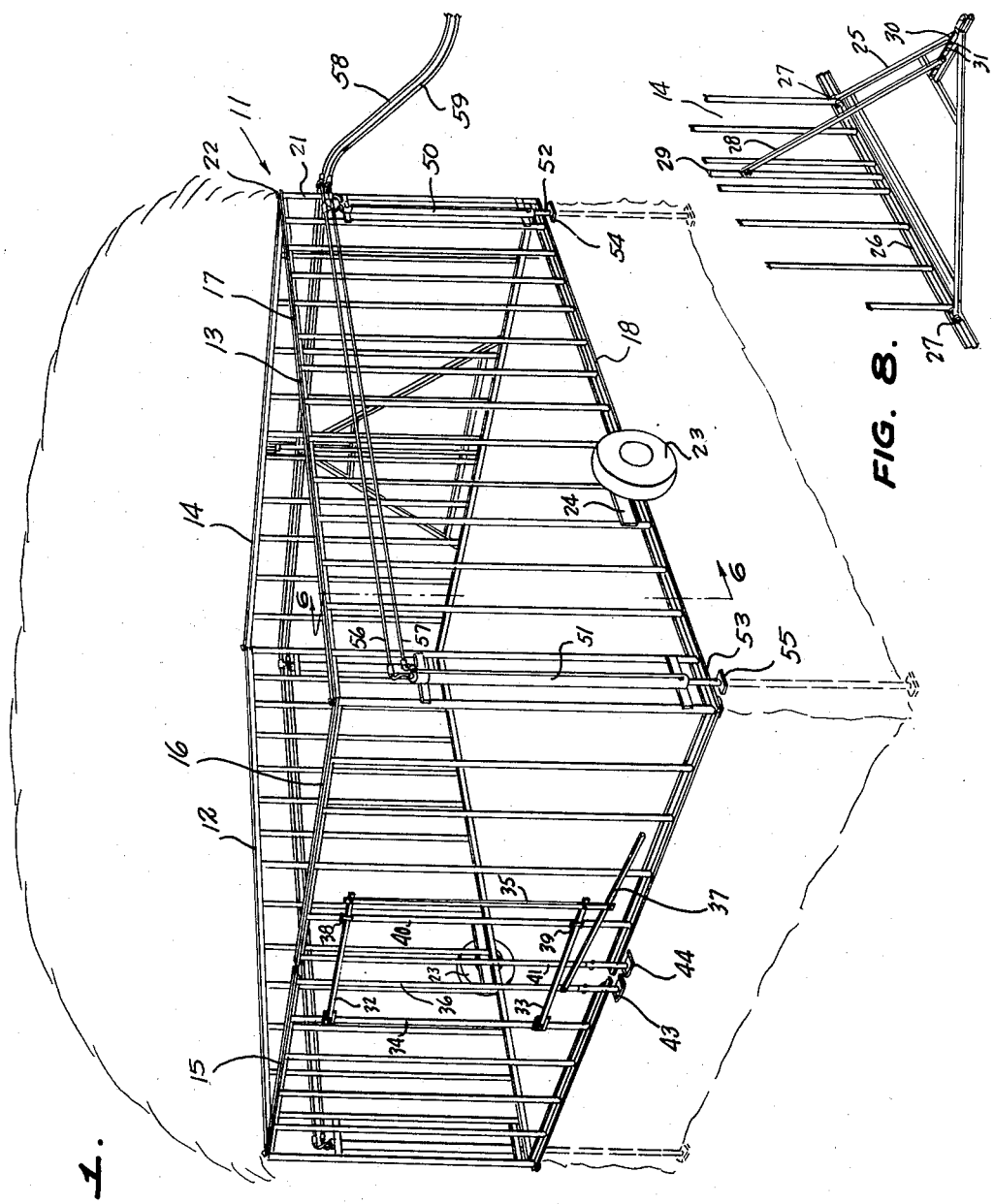
INVENTORS
PAUL W. BRANDT,
ANDREW H. SWART,
BY
McMorrow, Berman + Davidson
ATTORNEYS April 12, 1960 P. W. BRANDT ET AL 2,932,299
PORTABLE HYDRAULIC HAY STACKING CRIB
Filed Aug. 16, 1957
2 Sheets-Sheet 2
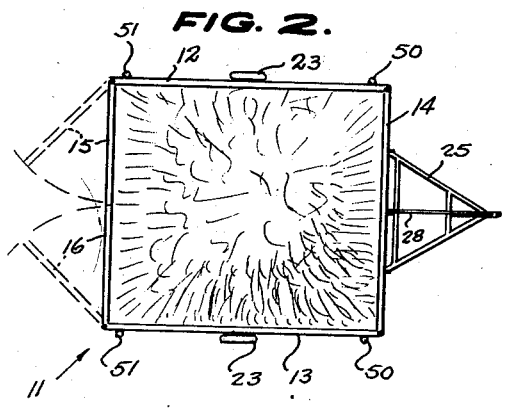
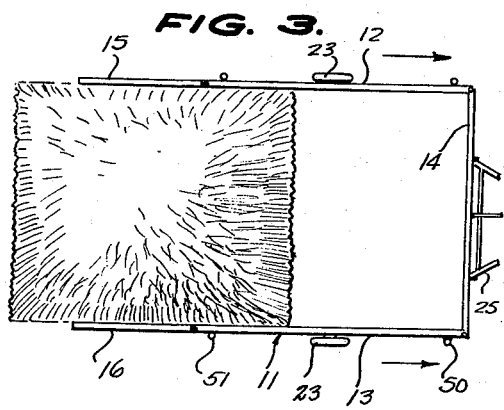
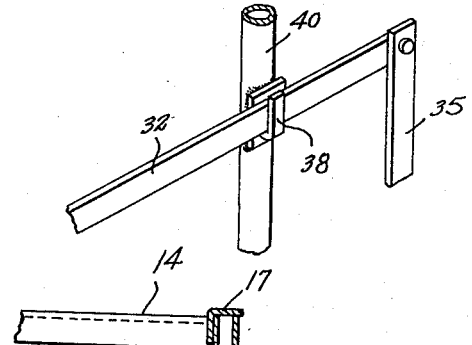
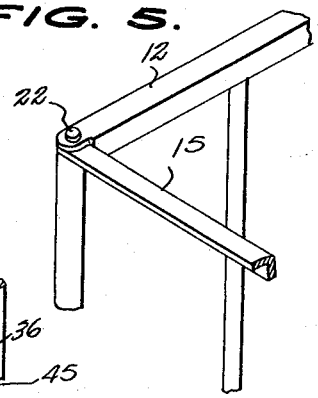
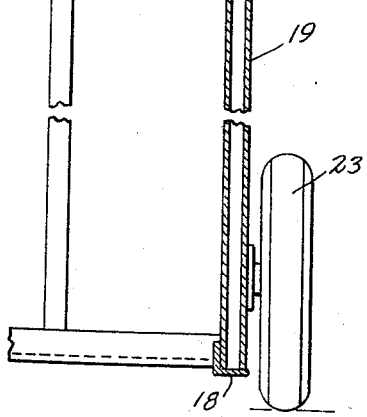
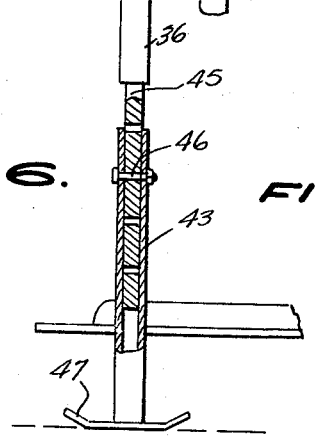
INVENTORS
PAUL W. BRANDT,
ANDREW H. SWART,
BY
McMorrow, Berman + Davidson
ATTORNEYS.

United States Patent Office 2,932,299
Patented Apr. 12, 1960

2,932,299

PORTABLE HYDRAULIC HAY STACKING CRIB

Paul W. Brandt, McHenry, and Andrew H. Swart, Grace City, N. Dak.

Application August 16, 1957, Serial No. 678,552

2 Claims. (Cl. 130—20)

This invention relates to apparatus for stacking hay, and more particularly to a portable stacking crib adapted to be hydraulically operated so as to vary its height.

A main object of the invention is to provide a novel and improved hay stacking crib which is simple in construction, which is easy to set up for use, and which enables an operator to readily adjust its height in accordance with the desired height of the haystack being formed by its use.

A further object of the invention is to provide an improved portable hay stacking crib which involves inexpensive components, which is durable in construction, which is easily transportable from one stacking site to another and from field to field, and which involves a minimum amount of parts.

Further objects and advantages of the invention will become apparent from the following description and claims, and from the accompanying drawings, wherein:

Figure 1 is a perspective view of an improved portable hay stacking crib constructed in accordance with the present invention.

Figure 2 is a top plan view, to a reduced scale, showing the hitch frame of the stacking crib fastened in an outwardly projecting position so that the crib may be connected to a tractor or other suitable vehicle for moving same.

Figure 3 is a fragmentary top plan view, similar to Figure 2, but showing the gate elements of the crib in open position to allow the crib to be disengaged from a hay stack.

Figure 4 is an enlarged fragmentary perspective view showing the engagement of the upper latch bar of the latch assembly for the gate elements with a vertical rod element of one of the gate elements of the crib shown in Figures 1 to 3.

Figure 5 is an enlarged fragmentary perspective view showing the hinged connection of one of the gate elements to the upper rear end portion of one of the side walls of the crib.

Figure 6 is an enlarged vertical cross sectional view taken on the line 6—6 of Figure 1.

Figure 7 is an enlarged elevational detail view, partly in vertical cross section, showing the vertical end rod of one of the gate elements of the crib and illustrating how the lower portion of the end rod is downwardly extensible.

Figure 8 is a fragmentary perspective view showing the manner in which the hitch frame of the crib may be secured in an outwardly projecting position relative to the crib enclosure so that the hitch frame may be connected to a tractor or similar vehicle.

Referring to the drawings, the crib is designated generally at 11 and comprises a generally rectangular vertical enclosure adapted to receive hay, said enclosure consisting of a pair of vertical side walls 12 and 13 and a transversely extending front end wall 14. Hinged to the rear ends of the vertical side walls 12 and 13 are the respective swingable gate elements 15 and 16 which are movable to transversely extending, opposing positions, as shown in Figure 1, to define the transversely extending rear wall of the enclosure.

Each of the vertical wall elements of the enclosure comprises top and bottom angle bars, for example, the top angle bar 17 and the bottom angle bar 18, shown in Figure 6, said angle bars being rigidly connected by vertical, tubular, spaced bar elements 19, defining a rigid, rectangular panel. Vertical tubular rod elements 21 are provided at the corners of the enclosure, and the ends of the angle bars are secured to the top and bottom ends of the corner post elements 21 in any suitable manner, as by the use of suitable fastening pins 22. Said fastening pins also serve as hinge pins for the swingable gate elements 15 and 16 at the rear end of the enclosure.

Respective supporting wheels 23, 23 are journaled to the intermediate portions of the opposite side wall elements 12 and 13, at the lower margins of said side wall elements, as is clearly shown in Figure 1, for supporting the enclosure for transportation, as required. The wheels 23 are journaled to respective longitudinally extending vertical plate elements 24 rigidly secured to the lower intermediate portions of the side wall elements 12 and 13.

Designated at 25 is a triangular hitch frame which is hingedly connected to the bottom angle bar 26 of the forward transverse vertical wall member 14, as by hinges 27, 27, shown in Figure 8. The hitch frame 25 may be swung to a vertical position and fastened to the vertical transverse front wall member 14 when the crib is at its intended location. When the crib is to be transported to a different location, the hinged hitch frame 25 is swung downwardly to the outwardly projecting position thereof, shown in Figure 8, and is secured in said position by a fastening strut 28 hingedly connected at its top end to an intermediate vertical rod element 29, rigidly secured to and forming part of the front transverse wall 14, said strut rod 28 being secured at its bottom end to an apertured vertical, longitudinally extending flange 30, forming part of the forward portion of the hitch frame 25. As shown in Figure 8, the flange 30 is provided with a plurality of longitudinally spaced apertures 31, and suitable bolt means is provided for fastening the lower end of the strut rod 28 to the flange 30 at a selected aperture 31.

The rear gate elements 15 and 16 are detachably secured in their transversely extending closed positions by a pair of latch bars 32 and 33 which are pivoted to a vertical bar element 34 forming part of the gate element 15, as shown in Figure 1. The latch bars 32 and 33 are connected at their free ends by a vertical link bar 35, thereby defining a parallelogram linkage consisting of the supporting vertical bar 34, the swingable latch bars 32 and 33, and the connecting link bar 35, the linkage being swingable in a vertical plane. Pivoted to the lower portion of the end vertical bar 36 of the gate element 15 is a control lever 37, said control lever being pivotally connected at its intermediate portion to the lower end of the link bar 35, whereby the parallelogram linkage above mentioned may be oscillated by rotating the control lever 37. Thus, the top and bottom latch bars 32 and 33 may be lifted vertically by lifting the control lever 37. The top and bottom latch bars 32 and 33 are lockingly engageable with respective latch hook elements 38 and 39 mounted on the vertical rod member 40 of gate element 16 adjacent to the end vertical rod element 41 of said gate element. Thus, the gate elements 15 and 16 may be locked in closed, transversely extending, opposing positions, by engaging the top and bottom latch bars 32 and 33 in the latch hook elements 38 and 39, as shown in Figure 1. The gate elements may be released by lifting the latch bars 32 and 33 by means of lever 37 when it is desired to open the gate elements, for example, to swing the gate elements from the closed positions thereof of Figure 2 to the open positions thereof shown in Figure 3.

The vertical end bars 36 and 41 of the gate elements 15 and 16 are provided with respective downwardly extensible shoe members 43 and 44, said members comprising telescopic sleeves slidably engageable on rod elements 45 rigidly secured in the lower ends of the bar members 36 and 41, the sleeve 43 being adjustable to desired positions and being provided with fastening bolts 46 which are engageable through the sleeves and through the associated rods 45 to fasten the shoe members 43 and 44 in desired adjusted depending positions. Each shoe member is provided at its bottom end with a ground-engaging plate 47.

Secured to the front and rear marginal portions of the respective side wall elements 12 and 13 are respective vertical hydraulic cylinders 50 and 51 containing extensible piston rods 52 and 53 provided at their lower ends with ground-engaging shoe elements 54 and 55, as shown in Figure 1. Connected to the cylinders in a conventional manner are the intake and return conduits 56 and 57, the intake conduits being connected to the top ends of the cylinders and the return conduits being connected to the lower end portions of the cylinders, said conduits 56 and 57 being respectively connected to the hydraulic fluid supply conduit 58 and the hydraulic fluid return conduit 59, adapted to be connected to the hydraulic system of a tractor or similar vehicle. As will be apparent from Figure 1, the cylinders 50 and 51 are simultaneously operated, so that the front and rear piston rods 52 and 53 are simultaneously extended responsive to the admission of hydraulic fluid into the upper end portions of the cylinders 51 and 50 from the supply conduit 56. The piston rods 52 and 53 may be retracted by suitably reversing the direction of flow of the pressure fluid, as by the use of suitable valve means at the source of fluid pressure, for example, as by the use of suitable reversing valve means on the tractor associated with the crib, so that fluid under pressure will be admitted to the cylinders at the lower portions thereof through the conduit 57, and whereby fluid will be discharged from the upper portions of the cylinders through the remaining conduits 56 associated with the cylinders.

As shown in Figure 2, hay may be stacked in the enclosure until the hay reaches the level of the top of the enclosure, after which the enclosure may be elevated by extending the piston rods 52 and 53 in the manner above described. After the hay has been stacked to the maximum height allowed by the elevation of the enclosure, the enclosure may be lowered until the ground-engaging wheels 23 engage the ground, after which the enclosure may be disengaged from the formed hay stack by moving the enclosure forwardly, the gate members 15 and 16 being swung to their open positions, as shown in Figure 3, to permit such forward movement of the crib. The crib may then be moved to the next location where hay is to be stacked, and the procedure then repeated, whereby to form another hay stack.

While a specific embodiment of an improved hay stacking crib has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A hay stacking crib comprising a vertical enclosure adapted to receive hay, said enclosure including side walls, a front end wall, and a pair of vertical gate elements hinged to the rear ends of said side walls and being swingable inwardly to transverse positions to define a rear end wall, cooperating latch means on said gate elements to releasably secure said gate elements in said transverse positions, a vertical hydraulic cylinder attached to each of said side walls, a downwardly extensible piston rod projecting from each of said cylinders, a ground-engaging shoe element on the free end of each piston rod, and respective ground-engaging wheels journaled to the opposite sides of said enclosure, said piston rods upon execution of their downward extensible movement moving the shoe elements into engagement with a ground surface and elevating said enclosure.

2. The hay stacking crib according to claim 1 which includes in addition a hitch frame positioned forwardly of said front end wall so as to project from said end wall and connected to said front end wall for movement from the projected position to a vertical position with respect to said front end wall.

References Cited in the file of this patent

UNITED STATES PATENTS

| | | |
|---|---|---|
| 881,705 | Murray | Mar. 10, 1908 |
| 1,430,761 | Sheets | Oct. 3, 1922 |
| 1,558,983 | Horstkotte | Oct. 27, 1925 |
| 1,585,715 | Huerth | May 25, 1926 |
| 2,513,003 | Christensen | June 27, 1950 |
| 2,679,250 | Terhune | May 25, 1954 |